United States Patent [19]
Wang

[11] Patent Number: 5,548,473
[45] Date of Patent: Aug. 20, 1996

[54] CONDENSERS

[76] Inventor: Ching-Heng Wang, No. 12, 18th Road, Industry Park, Taichung City, Taiwan

[21] Appl. No.: 526,551

[22] Filed: Sep. 12, 1995

[51] Int. Cl.[6] .............................. H01G 4/00; H01G 4/224
[52] U.S. Cl. .................... 361/301.1; 361/301.3; 361/308.2; 361/517; 361/519; 361/535
[58] Field of Search .................. 174/52.1, 52.3, 174/52.4; 361/301.1, 301.3, 308.2, 517, 518, 519, 535, 536, 820, 815, 823; 336/90, 96

[56] References Cited

U.S. PATENT DOCUMENTS 3,629,758  12/1971  Pearce .................................. 336/90
5,140,298  8/1992  Gordon et al. ....................... 174/52.1
5,444,427  8/1995  Ida et al. ............................... 336/96

Primary Examiner—Leo P. Picard
Assistant Examiner—Anthony Dinkins
Attorney, Agent, or Firm—Morton J. Rosenberg; David I. Klein

[57] ABSTRACT

A condenser including a casing having parallel open chambers and receptacles at two opposite ends of each open chamber, a plurality of condenser elements respectively mounted in the open chambers, a plurality of contact metal plates respectively mounted in the receptacles for the connection of lead wires, each contact metal plate having a contact portion inserted into one open chamber and disposed in contact with one end of the corresponding condenser element, a cover covered on the casing over the receptacles and having wire holes corresponding to the receptacles for passing lead wires.

9 Claims, 3 Drawing Sheets

CONDENSERS

BACKGROUND OF THE INVENTION

The present invention relates to condensers, and relates more particularly to such a condenser which has a plurality of condenser elements mounted in parallel within a casing and covered by a cover.

Regular condensers are commonly comprised of a casing, two contact metal plates fastened to the inside of the casing at two opposite ends, and a condenser element mounted inside the casing and connected between the contact metal plates. Because one condenser has only one condenser element, much installation space is needed when several condensers are used. Furthermore, when several condensers are installed, the electric wiring is difficult to arrange.

SUMMARY OF THE INVENTION

The present invention has been accomplished to provide a condenser which holds a plurality of condenser elements within a casing. According to one embodiment of the present invention, the condenser comprises a casing having parallel open chambers and receptacles at two opposite ends of each open chamber, a plurality of condenser elements respectively mounted in tile open chambers, a plurality of contact metal plates respectively mounted in the receptacles for the connection of lead wires, each contact metal plate having a contact portion inserted into one open chamber and disposed in contact with one end of the corresponding condenser element, a cover covered on the casing over the receptacles and having wire holes corresponding to the receptacles for passing lead wires.

DETAILED DESCRIPTION OF THE PREFERRED EMBODIMENT

Figure 1:
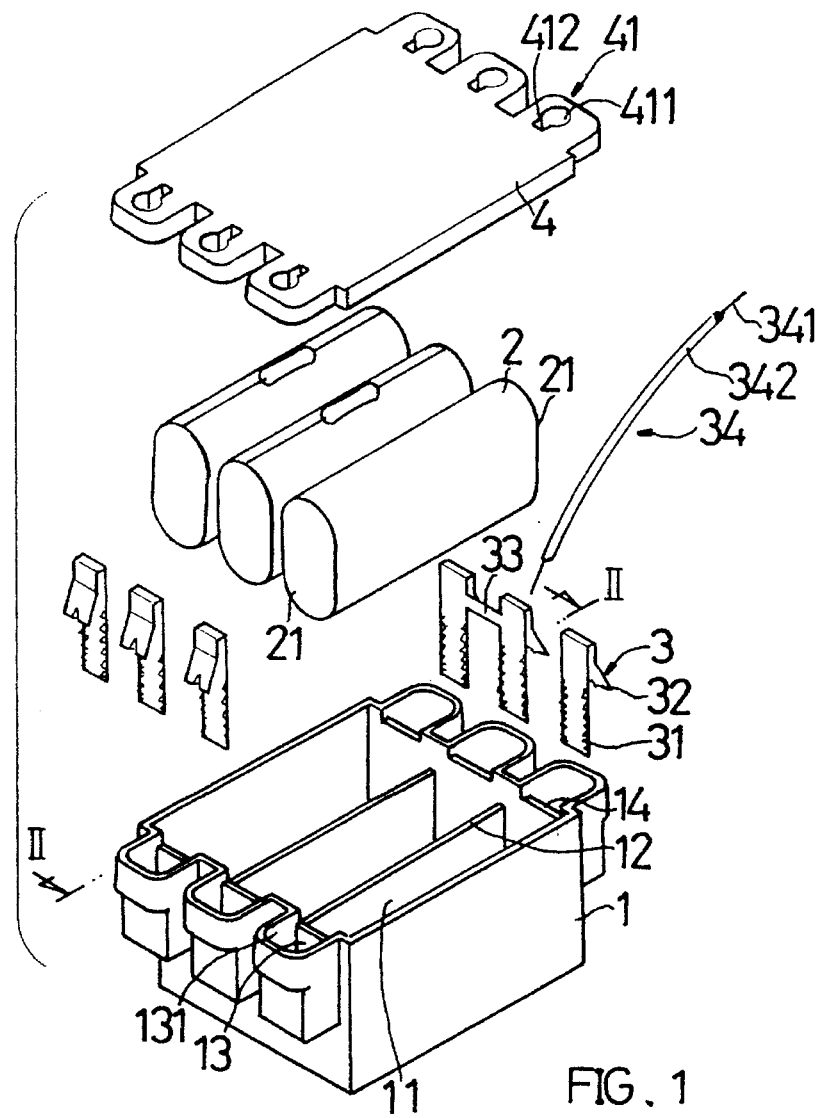
FIG. 1 is an exploded view of a condenser according to a first embodiment of the present invention.
Figure 2:
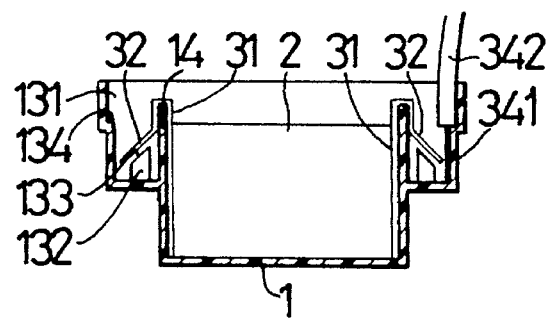
FIG. 2 is a sectional view taken along line II—II of FIG. 1.

Referring to FIGS. 1 and 2, a condenser according to a first embodiment of the present invention is generally comprised of a casing 1, a cover 4 covered on the casing 1, and three condenser elements 2 mounted inside the casing 1. The casing 1 comprises three open chambers 11 longitudinally arranged in parallel and separated by partition walls 12 for receiving the condenser elements 2 respectively, three pairs of receptacles 13 respectively disposed at two opposite ends corresponding to the two opposite ends of each open chamber 11. These three open chambers are on an imaginary horizontal plane. The receptacles 13 are respectively separated from the open chambers 11 by wall 14, each comprising a stop edge 134 on the inside wall 131 thereof, an upright projecting rod 132 on the inside terminating in a beveled top end 133. The beveled top end 133 slopes downwardly forward. A plurality of contact metal plates 3 are respectively fastened to the receptacles 13. Each contact metal plate 3 has a flat contact portion 31 mounted in one open chamber 11 and disposed in contact with one end 21 of the corresponding condenser element 2, and a curved connecting portion 32 inserted into one receptacle 13 and matched with the beveled top end 133 of the corresponding upright projecting rod 132. Also, the conductor 341 of an inserted lead wire 34 is held by a rebounded force created by the curved connecting portion 32.

The cover 4 is covered on the casing if having a plurality of wire holes 411 at two opposite ends corresponding to the receptacles 13 of the casing 1, and a plurality of notches 412 at one end of each wire hole 411. Two lead wires 34 are respectively inserted through one wire hole 411 at the end of the cover 4 into a corresponding receptacle 13 and connected to a corresponding contact metal plate 3. Each lead wire 34 has two portions: a conductor 341 and an insulator 342. When assembled, the insulator 342 of each lead wire 34 is stopped at the stop edge 131 of the corresponding receptacle 13 by the cover 4, and the conductor 341 is retained in place by the connecting portion 32 of the corresponding contact metal plate 3. Furthermore, a link 33 are provided to connect two adjacent contact metal plates 3 together so that the linked contact metal plates 3 are connected to the two opposite ends 21 of the condenser elements 2 in parallel. Therefore, each lead wire 34 can be fastened to either contact metal plate 3 at one end of the casing 1. Furthermore, the notches 412 are provided for the insertion of a tool to force the connecting portion 32 away from the conductor 341 for permitting the lead wire 34 to be separated from the respective contact metal plate 3.

Figure 3:
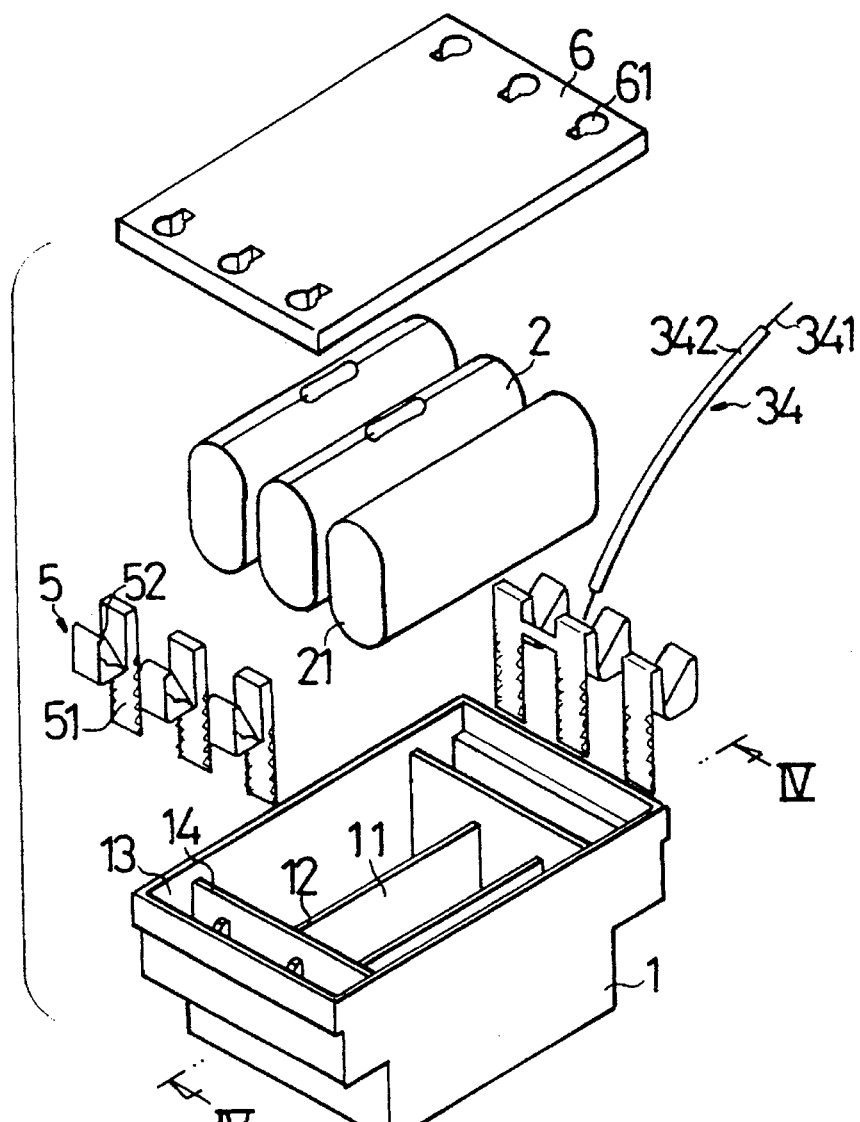
FIG. 3 is an exploded view of a condenser according to a second embodiment of the present invention.
Figure 4:
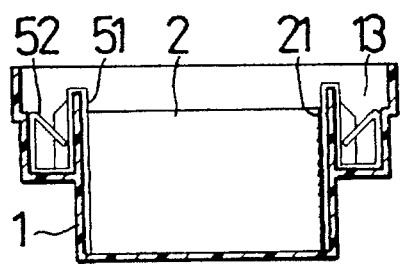
FIG. 4 is a sectional view taken along 1line IV—IV of FIG. 3.

FIGS. 3 and 4 show a condenser according to a second embodiment of the present invention, in which the three receptacles 13 at each end of the casing 1 are linked together and separated from the open chambers 11 by a common wall 14; each contact metal plate 5 has a flat contact portion 51 disposed in contact with one end 21 of one condenser element 2; the cover 6 fits over the casing 1, having wire holes 61 for passing the lead wires 34. The top end of the flat contact portion 51 is bent downward for bridging over the wall 14, then bent forward to a certain distance, then bent upward, and then bent downward to form a connecting portion 52 for insertion into one receptacle 13 for connection to the conductor 341 of one lead wire 34.

Figure 5:
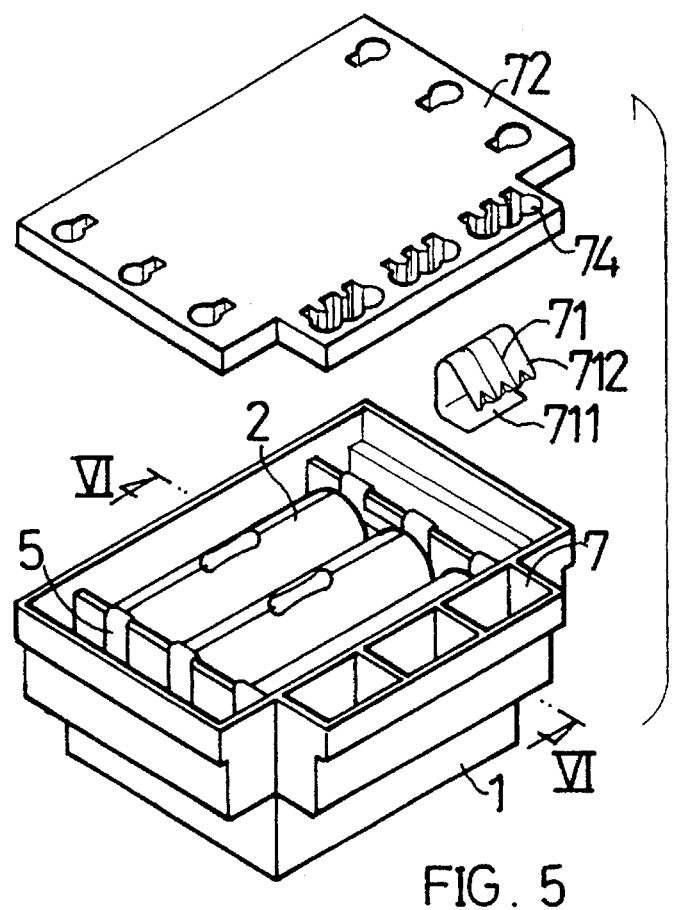
FIG. 5 is an exploded view of a condenser according to a third embodiment of the present invention.
Figure 6:
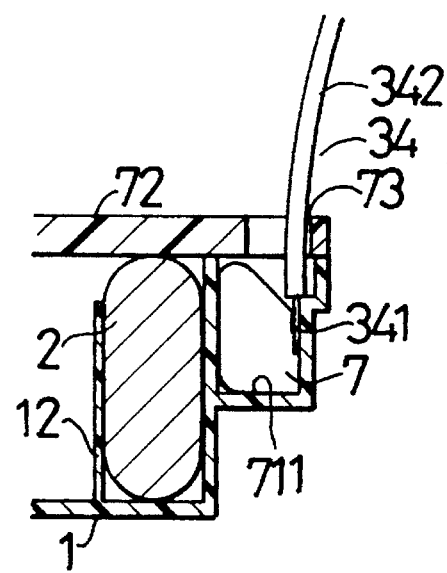
FIG. 6 is a sectional view taken along line VI—VI of FIG. 5.

FIGS. 5 and 6 show a condenser according to a third embodiment of the present invention, in which a plurality of metal spring plates 71 are respectively mounted in respective side chambers 7 at one side of the casing 1, each metal spring plate 71 has a fixed locating end 711 fastened to one side chamber 7, and a curved free end 712 connected to the conductor 341 of one lead wire 34. As illustrated in FIG. 6, when the lead wire 34 is inserted through one side through hole 74 on the cover 72 into one side chamber 7, the free end 712 of the corresponding metal spring plate 71 is forced inwards to let the conductor 341 of the lead wire 34 pass. When the conductor 341 of the lead wire 34 is stopped at the bottom end of the respective side chamber 7, the free end 712 of the metal spring plate 71 returns to its former position to stop the conductor 341 of the lead wire 34 in place. At the same time, the insulator 342 of the lead wire 34 is retained in place by the cover 72.

I claim:

1. A condenser comprising:

a casing, said casing comprising a plurality of open chambers longitudinally arranged in parallel and separated by partition walls, said open chambers being on a horizontal plane, a plurality of receptacles respectively disposed at two opposite ends of each open chamber and separated by walls;

a plurality of condenser elements respectively mounted in said open chambers;

a plurality of contact metal plates respectively mounted in said receptacles, each contact metal plate having one end inserted into one open chamber arid disposed in contact with one end of the corresponding condenser element, and an opposite end disposed in one receptacle for the connection of a lead wire which has a conductor and an insulator, a link being provided to connect two adjacent contact metal plates together so that the linked contact metal plates being connected in parallel by said link to form with the two opposite ends of said condenser elements into a parallel circuit; and a cover covered on said casing over said receptacles.

2. The condenser of claim 1 wherein each receptacle has an upright rod on the inside for stopping the respective contact metal place in place.

3. The condenser of claim 2 wherein said upright rod has a beveled top edge.

4. The condenser of claim 1 wherein each receptacle has a stop edge for stopping the insulator of a lead wire in place and make the lead wire electrically connected with the corresponding contact metal plate.

5. The condenser of claim 1 wherein each contact metal plate has a flat contact portion disposed in contact with one end of the corresponding condenser element, and a curved connecting portion inserted into one receptacle for the connection of the conductor of a lead wire, the conductor of the inserted lead wire being held by a rebounded force created by said curved connecting portion.

6. The condenser of claim 1 wherein at least two contact metal plates at each end of said casing are connected together by a link.

7. The condenser of claim 1 wherein each contact metal plate has a flat contact portion inserted into one open chamber and disposed in contact with one end of the corresponding condenser element, said flat contact portion having a top end bent downward and inserted into one receptacle, then bent forward, then bent upward, and then bent downward to form a connecting portion for connection to the conductor of one lead wire.

8. The condenser of claim 1 wherein said casing comprises a plurality of side chambers at one side; a plurality of metal spring plates are respectively mounted in said side chambers for the connection of lead wires, each metal spring plate having a fixed locating end fastened to one side chamber, and a curved free end for the connection of the conductor of one lead wire, said curved free end being forced backwards for passing the conductor when a lead wire is inserted, and then immediately returning to its former position to hold down the conductor of the lead wire.

9. The condenser of claim 1 wherein said cover has wire holes corresponding to the receptacles of said casing for the insertion of lead wires.

* * * * *